T. STROTHMANN.
RECEPTACLE FOR ORIGINAL CONTAINERS.
APPLICATION FILED DEC. 23, 1913.

1,156,506. Patented Oct. 12, 1915.

Witnesses:
Casanave Young
May Downey

Inventor
Theodor Strothmann
By Chestnut & Young
Attorneys.

UNITED STATES PATENT OFFICE.

THEODOR STROTHMANN, OF MILWAUKEE, WISCONSIN.

RECEPTACLE FOR ORIGINAL CONTAINERS.

1,156,506.          Specification of Letters Patent.      Patented Oct. 12, 1915.

Application filed December 23, 1913. Serial No. 808,490.

*To all whom it may concern:*

Be it known that I, THEODOR STROTHMANN, a subject of the Emperor of Germany, and resident of Milwaukee, in the county of Milwaukee and State of Wisconsin, have invented certain new and useful Improvements in Receptacles for Original Containers; and I do hereby declare that the following is a full, clear, and exact description thereof.

The primary object of my invention is to provide a simple, economical and sanitary receptacle for original packages of milk or analogous food products.

With the above object in view it is contemplated to so construct and arrange a receptacle with laminated walls built up from successive layers of felt, asbestos and wood, all secured to an outer metallic shell body to resist exterior strain and at the same time render the interior of the receptacle impervious to exterior atmospheric changes. By this arrangement milk at the desired preserving temperature placed in a bottle can be sealed within the receptacle, shipped and delivered to the consumer without material change in its temperature, whereby the milk is not only sanitary when bottled, but may be kept in such condition indefinitely.

Another object of my invention is to provide means for securing the bottle receptacle to a receiving support that is conveniently placed at the dwelling of each consumer, it being understood that the bottled product is thus hermetically sealed within the receptacle and kept therein until opened by the consumer.

With the above objects in view the invention consists in certain peculiarities of construction and combination of parts as hereinafter set forth with reference to the accompanying drawings and subsequently claimed.

Figure 1:
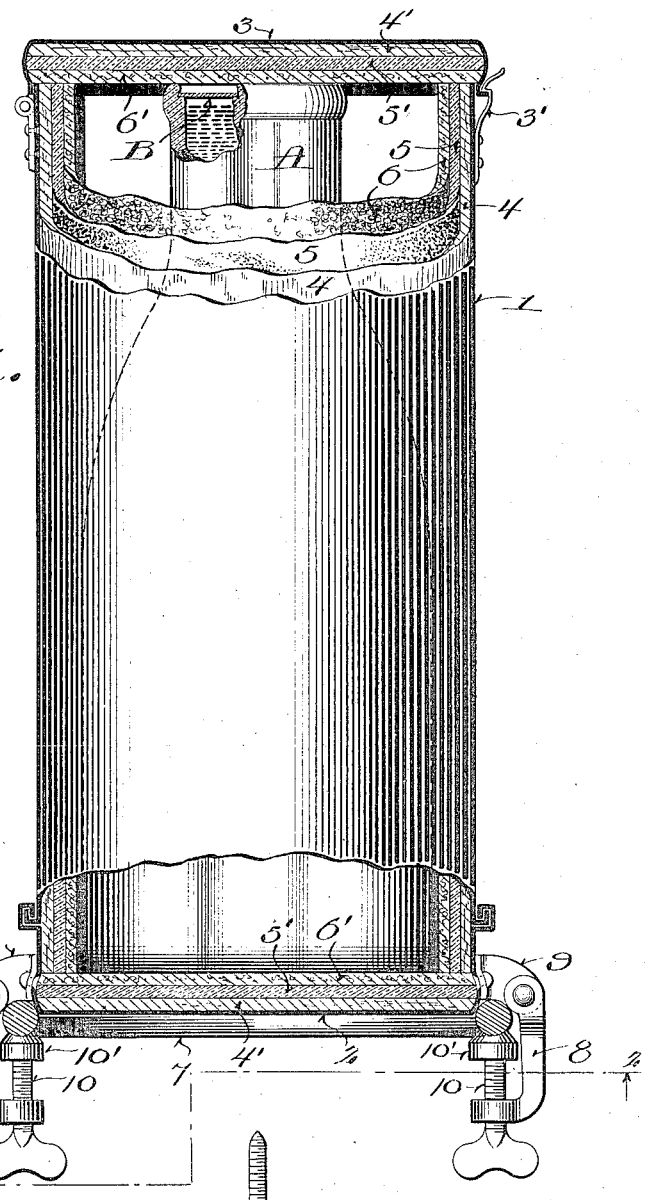
Figure 2:
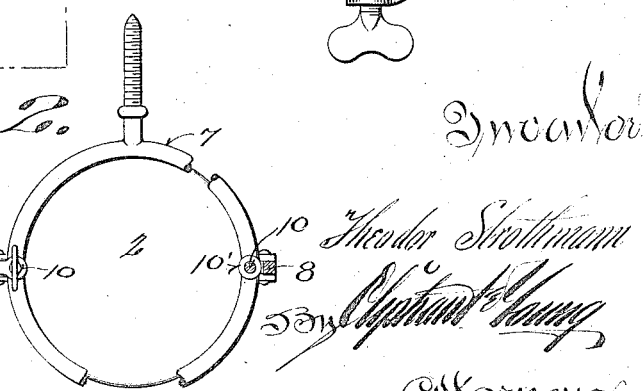

In the drawings Figure 1 represents an elevation of a receptacle embodying the features of my invention, with parts broken away and in section to more clearly illustrate the details of construction, the said receptacle being shown with a bottle of milk fitted therein, and Fig. 2, a detailed sectional inverted plan view upon a reduced scale of a receptacle support.

Referring by characters to the drawings, 1 represents a cylindrical metallic shell body, 2 the bottom thereof, and 3 a circular lid member, which member is in hinge connection with the body and is adapted to be closed down upon the mouth of said body and secured by a snap lock 3'. Secured to the inner face of the metallic shell is a layer of wood 4 and fitted to the same is a layer of asbestos 5, to which layer of asbestos there is secured a lining layer 6 of felt or analogous material. The lid and circular bottom members of the shell are also provided with successive layers of wood, asbestos and felt 4', 5', 6', respectively, the said layers forming laminated walls adapted to resist variations in temperature or atmosphere. Hence it will be seen by the foregoing arrangement of the lining that a wood filler is arranged to engage the sheet metal comprising the shell and end jackets of the lid and bottom. By utilizing a wood filler of this character moisture due to variations in the external and internal temperature will be absorbed, whereby sweating of the metal is taken care of and, as the wood will readily take up the moisture, it will also gradually permit said moisture to be dried out without detrimental effects to the other linings. The asbestos element of the lining being interposed between the inner facing of felt and wood surface as a non-conductor and will also preserve the wood filler and prevent deterioration of the composite lining as a whole. The felt inner facing 6 serves to take up heat or cold from within readily and also forms a soft lining for articles to be placed in the receptacle. In practice it has been found that this arbitrary arrangement of the filler laminations will produce the most efficient results in a receptacle of this character. Another important feature of my invention is the arrangement whereby the composite lining for the lid and bottom are of a circular diameter equal to the approximate diameter of the cylinder to thus seal the ends of the cylinder lining, as shown, the felt inner lining 6' being extended across the ends of the three materials forming the cylinder lining to thus effect a tight joint, while at the same time the felt will permit a slight yield when it is pressed firmly against the ends of said cylinder lining.

Fitted into the receptacle is a bottle A, the mouth of which is sealed by a cap B and this container is of approximately the same height as the receptacle, whereby the mouth of said container is engaged and sealed by the lid 3 when the latter is closed as shown. Thus the bottle containing milk or other food product is not only initially sealed in the original package, but the lid member constitutes an auxiliary seal and the close fit of the bottle within the receptacle also prevents said bottle from shifting when in transit. The sealed receptacle, due to the composite walls, will thus maintain the contents of the bottle at approximately a fixed temperature irrespective of changes in the exterior temperatures to which the receptacle may be subjected.

It is proposed to incase the original packages in receptacles of the above described construction and to shift the same from the point of bottling to the consumer, whereby sanitary milk is insured, and, while I have shown a snap lock for the lid, it is understood that the lid may be effectually sealed by a stamp or paster indicating that the original package has not been opened.

In order to provide a convenient holder for the receptacle at the point of delivery, each dwelling is provided with a receiving support 7, which support may be in the form of a skeleton hoop, as shown in Fig. 2. The said support is adapted to receive the bottom of the shell body and said shell is rigidly attached to the receiver by means of one or more shackles 8, which shackles are hinged to ears 9 that extend from the shell body of the receptacle adjacent to its bottom. The shackles carry clamping screws 10 having feet 10' that are adapted to engage the receiving support. Thus it will be seen that the hook portion of the support 7 is fitted about the bottom of the receptacle, which bottom extends slightly below the upper edge of the support and the ears 9 that project from the receptacle straddle the support 7 so as to form an interlocking nested connection.

It is obvious that in place of utilizing a skeleton support as shown in Fig. 2, any suitable form of solid support may be utilized, in which case the shackles can be readily adjusted to meet the demand for clamping said receptacle thereto, and, in shipping the receptacle, the shackles being free, will permit each receptacle to rest upon its own bottom.

I claim:

A cylindrical metal shell having a lining comprising first a layer of wood in contact with the metal shell, an inner lining of felt and a filler layer of asbestos between the felt and wood, the edges of said layers terminating flush with the edges of the metallic shell to present exposed flat end faces, a circular metallic lid and bottom member adapted to be fitted over the shell ends, the said lid and bottom members being permanently fitted with linings comprising, first, a wood layer in abutment with the metal, second, a filler layer of asbestos and, third, an outer facing composed of felt, the said felt facing of the bottom and lid members being in direct engagement with the flat end faces comprising the metal shell and laminated lining whereby a non-metallic joint is effected between the members constituting the shell body and bottom and lid member, and means for permanently securing the bottom member to the shell body.

In testimony that I claim the foregoing I have hereunto set my hand at Milwaukee in the county of Milwaukee and State of Wisconsin in the presence of two witnesses.

THEODOR STROTHMANN.

Witnesses:
 Geo. W. Young,
 Math Heitenbach.